Figure 1:
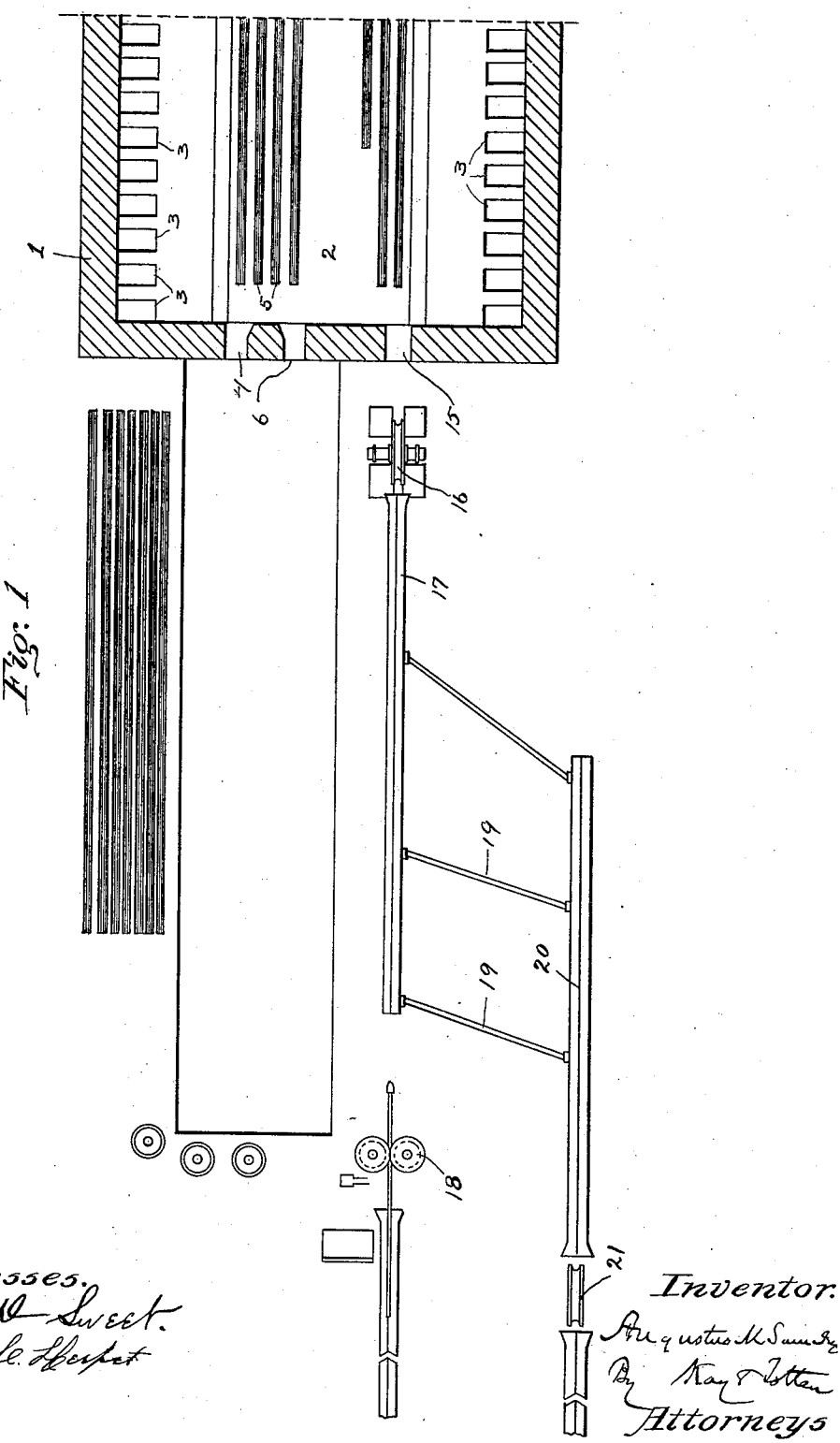

No. 742,500. PATENTED OCT. 27, 1903.
A. M. SAUNDERS.
APPARATUS FOR THE MANUFACTURE OF LAPWELD PIPE.
APPLICATION FILED SEPT. 11, 1902.
NO MODEL. 3 SHEETS—SHEET 1.

Witnesses. Inventor.

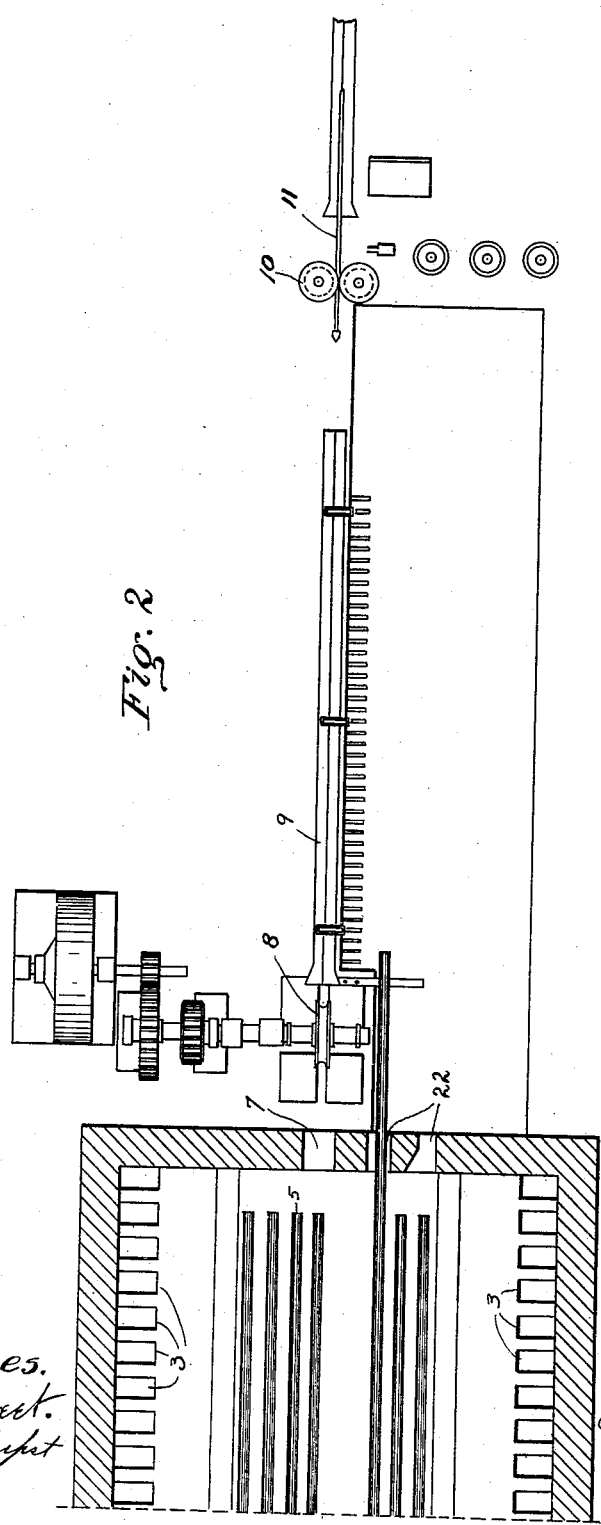

No. 742,500. PATENTED OCT. 27, 1903.
A. M. SAUNDERS.
APPARATUS FOR THE MANUFACTURE OF LAPWELD PIPE.
APPLICATION FILED SEPT. 11, 1902.
NO MODEL. 3 SHEETS—SHEET 3.
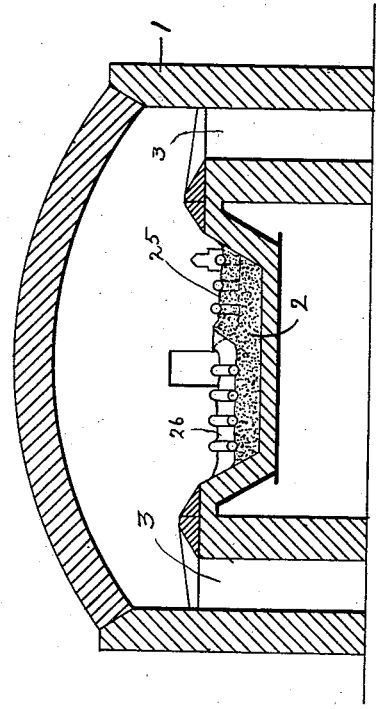
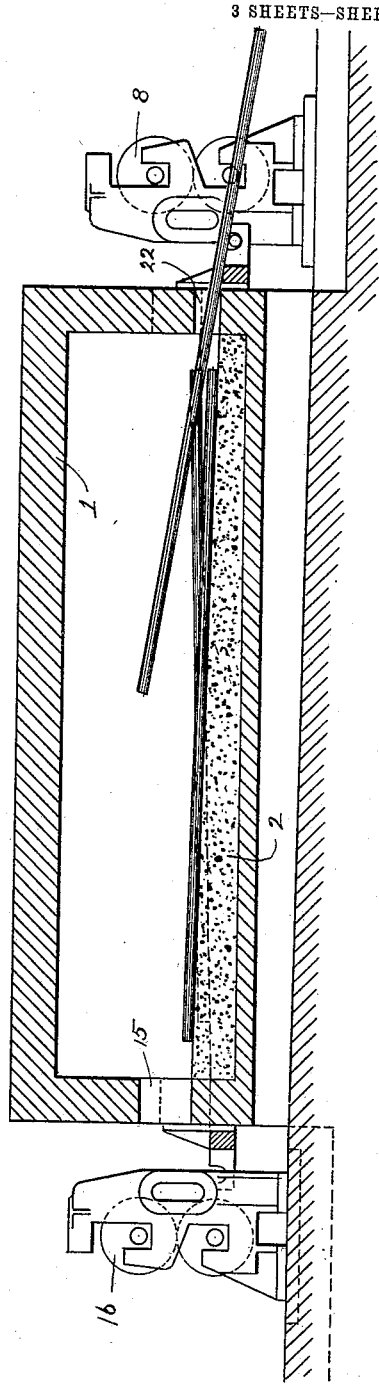
Witnesses.
Inventor.

No. 742,500.

Patented October 27, 1903.

UNITED STATES PATENT OFFICE.

AUGUSTUS M. SAUNDERS, OF McKEESPORT, PENNSYLVANIA, ASSIGNOR TO NATIONAL TUBE COMPANY, OF PITTSBURG, PENNSYLVANIA, A CORPORATION OF NEW JERSEY.

APPARATUS FOR THE MANUFACTURE OF LAPWELD PIPES.

SPECIFICATION forming part of Letters Patent No. 742,500, dated October 27, 1903.

Application filed September 11, 1902. Serial No. 123,010. (No model.)

*To all whom it may concern:*

Be it known that I, AUGUSTUS M. SAUNDERS, a resident of McKeesport, in the county of Allegheny and State of Pennsylvania, have invented a new and useful Improvement in Apparatus for the Manufacture of Lapweld Pipe; and I do hereby declare the following to be a full, clear, and exact description thereof.

My invention relates to apparatus for manufacturing lapweld tubing, and more especially for manufacturing boiler-tubes and other lap-weld tubing which are given a second run through the furnace and welding apparatus.

The object of my invention is to provide apparatus for manufacturing such tubing whereby the output of the furnace is increased and the cost of operating the same reduced.

In the manufacture of boiler and similar tubes the practice heretofore has been to form them in the ordinary way of making lapweld tubing—that is, from the bent-up skelp which was charged into a heating-furnace and raised to a welding heat and then pushed out of the furnace through welding-rolls and over a ball. This operation completes the welding of the usual lapweld tubing; but for use as boiler-tubes and elsewhere where greater strength is required it is necessary to give such tubes a second run through the furnace and welding apparatus. The usual practice is to operate the furnace for half a day on the first run, the tubes as they are welded being laid aside and permitted to cool, and then for the other half of the day the furnace is operated on the second run—that is, the welding-rolls are readjusted to the necessary size and the previously-welded tubes are charged into the furnace, again raised to a welding heat, and pushed out of the same and passed through the welding-rolls and over the ball. According to this practice the output of the furnace is limited to half a day's run and is about six hundred (600) tubes per day, this being the number which can be given the first run in the forenoon and the second run in the afternoon. The only way of increasing this output under the old method would be by having two furnaces, one for giving the first run and another for giving the second run, the tubes being transferred from the first furnace to the second. This, however, would necessitate the building of two furnaces and providing independent charging and welding apparatus for each of said furnaces, besides requiring two complete crews of eleven men each, so that while by means of such furnaces the output of the present single furnace would be practically doubled the expense would also be practically doubled and no saving would result.

The object of my invention is to provide apparatus for forming lapweld tubing which must be given two runs, whereby the output can be increased without a corresponding increase in cost.

To this end it consists in adding to a furnace in which lapweld tubing is formed in the ordinary way means whereby the welded tube, preferably before the same has cooled, is recharged into the same furnace, and also providing an additional set of welding-rolls through which the tube after reheating is given a second run.

My invention also comprises an arrangement whereby the end of the tube which is presented to the second set of rolls is the opposite one from that presented to the first set of rolls, thus preventing the tapering of the walls of the tube and also presenting a more perfect end to the second pair of welding-rolls.

My invention also comprises a furnace-hearth having longitudinal sections sloping in opposite directions.

In the accompanying drawings, Figure 1 is a plan view of the rear half of the furnace. Fig. 2 is a similar view of the front half of the furnace. Fig. 3 is a transverse vertical section through the furnace, and Fig. 4 is a longitudinal vertical section through the same.

The furnace employed may be of any approved type, but preferably being heated by gas and of the regenerative type. Such a furnace is shown at 1, and it has the usual side, end, and top walls and is provided with a hearth 2 and regenerator-ports 3. The hearth 2 will be made somewhat wider than in the ordinary lapweld furnace, so as to contain in addition to the necessary number of skelp also a number of tubes for reheating preparatory to being given the second run. This furnace is provided at its rear end with openings 4, through which the skelp 5 are charged into the furnace, said skelp preferably being charged in on one side of the hearth, and as they heat are rolled over toward the center of the furnace and a fresh skelp charged into the vacant space, as is now the custom. The rear of the furnace is also provided with openings 6 for insertion of a suitable bar or fork for pushing the skelp out of the front end of the furnace and into the welding-rolls. The front end of the furnace is provided with a withdrawing-opening 7, through which the heated skelp are pushed on their way to the welding-rolls 8. These rolls are or may be of any desired construction and driven in any suitable way, and in line therewith is the usual trough 9 for receiving the tube and the rolls 10 for projecting the mandrel-bar 11, which supports the ball over which the skelp is welded. All of these parts are or may be of the usual construction and form no part of my invention and the precise arrangement shown is illustrative merely.

In my invention the rear end of the furnace will be provided with a second withdrawing-opening 15, and in line therewith will be another pair of welding-rolls 16, trough 17, mandrel-bar-operating rolls 18, and mandrel-bar and ball, all of which are or may be precisely the same as the welding-rolls, trough, and mandrel first described. At the side of the trough 17 are inclined ways or skids 19, leading to the sizing-trough 20 in line with the sizing-rolls 21 and which are constructed in the usual manner. In the front end of the furnace at the side of the withdrawing-opening 7 is the recharging-opening 22.

In the use of my apparatus the skelp 5 are charged through the opening 4, and as they heat they are progressively rolled over toward the center of the furnace until in line with the withdrawing-opening 7. When the edges of the skelp are raised to a good welding heat, they are pushed out in succession through said opening 7 and into the welding-rolls 8, through which they are passed over the ball in the usual way, also passing over the mandrel-bar 11 in the trough 9. As soon as the tube has cleared the welding-rolls the mandrel-bar 11 is withdrawn in the usual way, and then said tube is taken from the trough 9, moved laterally in any suitable way or by any suitable mechanism, and recharged into the furnace through the opening 22, being pushed into the furnace rear end foremost. As it heats it will be moved over laterally toward the outside of the furnace until in line with the withdrawing-opening 15. As soon as again raised to a good welding heat it is pushed out of the furnace through the opening 15 into the rolls 16 and over the ball in the usual way. It is then transferred to the sizing-trough 20 and goes to the sizing-rolls 21 and thence to the straightening-rolls, according to the usual practice. It will be observed that the arrangement is such that the end of the tube which last passes through the first set of welding-rolls is presented to the second set of welding-rolls. As the front end of the tube is always more or less irregular this arrangement gives a better end for presentation to the second set of welding-rolls. Furthermore, by reason of the accumulation of cinder on the ball the walls of the tube are usually somewhat thinner at the rear end than at the forward end, giving a slight taper thereto; but by giving the tube a second run in the direction opposite to that in which it travels during the first run this tapering effect is almost entirely overcome.

In tube-welding apparatus it is desirable to make the hearth somewhat sloping, being lowest at the end opposite the charging-openings and highest at the end opposite the withdrawing-openings, this slope permitting the cinder and slag to run out at the charging-openings and preventing the same from accumulating on the hearth and being drawn into the rolls with the tube. With my furnace the hearth is provided with longitudinal portions sloping in opposite directions, the portion 25 sloping from the charging-opening 4 up to the withdrawing-opening 7, while on the opposite side of the furnace the hearth portion 26 slopes from the charging-opening 22 up to the withdrawing-opening 15. This arrangement permits the cinder and slag to run out at the charging-openings of each section of the furnace-bottom.

By my apparatus the tube is recharged into the furnace before it has lost an appreciable amount of heat, so that very little heat is necessary to again bring it to proper welding temperature. As a consequence the furnace can be operated at but a slight cost over the cost of operating the present furnaces for giving a single run. Furthermore, only three or four workmen will be required in addition to the eleven usually employed for a single crew, and the output of the furnace will be nearly doubled. The product is therefore greatly cheapened.

What I claim as my invention, and desire to secure by Letters Patent, is—

1. In apparatus for forming lapweld tubing, the combination of a furnace provided with two withdrawing-openings, one at each end, and two charging-openings, also one at each end, and welding-rolls in line with each of the withdrawing-openings.

2. In apparatus for forming lapweld tubing, the combination of a furnace provided with a charging-opening in its front end near one side, a withdrawing-opening on the same end near the other side, a withdrawing-opening and a charging-opening in the opposite end of the furnace near the middle, and welding-rolls in line with each of said withdrawing-openings.

3. In apparatus for forming lapweld tubing, the combination with a furnace provided with a hearth having longitudinal portions sloping in opposite directions, a charging-opening opposite the lower end of each section, a withdrawing-opening opposite the higher end of each section, and welding-rolls in line with each withdrawing-opening.

In testimony whereof I, the said AUGUSTUS M. SAUNDERS, have hereunto set my hand.

AUGUSTUS M. SAUNDERS.

Witnesses:
GERTRUDE KREMER,
ROBERT C. TOTTEN.